(12) United States Patent
Nocera

(10) Patent No.: US 8,758,844 B2
(45) Date of Patent: Jun. 24, 2014

(54) METHOD FOR THE PRODUCTION OF COFFEE

(75) Inventor: Roberto Nocera, Gradisca D'Isonzo (IT)

(73) Assignee: La San Marco S.p.A. (IT)

( * ) Notice: Subject to any disclaimer, the term of this patent is extended or adjusted under 35 U.S.C. 154(b) by 128 days.

(21) Appl. No.: 13/235,026

(22) Filed: Sep. 16, 2011

(65) Prior Publication Data

US 2012/0328739 A1   Dec. 27, 2012

(30) Foreign Application Priority Data

Jun. 23, 2011  (IT) .............................. UD2011A0096

(51) Int. Cl.
  *A23L 1/28* (2006.01)
(52) U.S. Cl.
  USPC ................................ 426/433; 426/82; 99/295
(58) Field of Classification Search
  USPC ............... 426/82, 433; 99/295, 280, 281, 282
  See application file for complete search history.

(56) References Cited

U.S. PATENT DOCUMENTS

| | | | |
|---|---|---|---|
| 3,364,842 A | 1/1968 | Valente | |
| 4,254,694 A * | 3/1981 | Illy | ................................ 99/295 |
| 4,966,070 A | 10/1990 | Frisch | |
| 7,322,274 B2 | 1/2008 | Wang | |
| 7,617,763 B2 | 11/2009 | Chen et al. | |
| 7,673,560 B2 | 3/2010 | Ruckstuhl | |
| 8,327,754 B2 | 12/2012 | Kirschner et al. | |
| 2003/0056661 A1* | 3/2003 | Hu et al. | ......................... 99/495 |
| 2004/0079237 A1* | 4/2004 | Denisart | ......................... 99/275 |
| 2004/0188459 A1* | 9/2004 | Halliday et al. | ................ 222/83 |
| 2004/0255790 A1* | 12/2004 | Green | ............................. 99/279 |
| 2005/0084569 A1* | 4/2005 | Hu et al. | ....................... 426/118 |
| 2006/0037482 A1* | 2/2006 | Maver | ............................. 99/288 |
| 2007/0181005 A1 | 8/2007 | Kirschner et al. | |
| 2007/0248734 A1* | 10/2007 | Denisart et al. | .............. 426/569 |
| 2007/0272084 A1* | 11/2007 | Mandralis et al. | .............. 99/275 |
| 2009/0126577 A1 | 5/2009 | Ternite | |
| 2010/0303964 A1 | 12/2010 | Beaulieu et al. | |

* cited by examiner

*Primary Examiner* — Rena L Dye
*Assistant Examiner* — Chaim Smith
(74) *Attorney, Agent, or Firm* — St. Onge Steward Johnston & Reens LLC

(57) ABSTRACT

A method for the production of drinks, particularly coffee, even more particularly "American type coffee" or filter coffee by means of a machine and a capsule containing a proportion of preparation for drink is disclosed. The method includes the phases of heating a liquid for the preparation of drinks, putting under pressure the liquid within a boiler, feeding the liquid to the capsule with crossing of the capsule, taking the liquid after this phase of crossing of the capsule. The method also includes an infusion and remixing phase of the liquid with the preparation for drink within the capsule, which occurs within a housing partially filled up with the preparation for drink according to a filling factor in the range from 35 to 90%, preferably in the range from 40 to 85%, even more preferably in the range from 45 to 75%.

18 Claims, 7 Drawing Sheets

METHOD FOR THE PRODUCTION OF COFFEE

CROSS-REFERENCE TO RELATED APPLICATIONS

The present Application claims priority of Italian Patent Application No. UD2011A000096 filed on Jun. 23, 2011, the content of which is incorporated herein by reference.

FIELD OF THE INVENTION

The present invention relates to an operating method of a machine for the production of hot drinks, particularly coffee, even more particularly "American type coffee" or filter coffee or filtered coffee.

The present invention also relates to a capsule for the production of hot drinks, particularly coffee, even more particularly "American type coffee" or filter coffee or filtered coffee.

The present invention also relates to a machine for the production of hot drinks, particularly coffee, even more particularly "American type coffee" or filter coffee or filtered coffee.

In the present description and in the appended claims and for the aims of the present invention and of the sought protection the terms "American type coffee", "filter coffee" and "filtered coffee" must be intended as generically equivalent unless otherwise stated and as being referred to a coffee drink which is prepared by means of infusion of the coffee powder in hot water.

BACKGROUND OF THE INVENTION

In the field of the production of machines for the automatic production of hot drinks the use of capsules, within which a predetermined quantity of coffee or another preparation for drinks is introduced, e.g. a preparation for the tea, milk powder, etc., is known. The user introduces a capsule into a corresponding machine for the production of hot drinks which creates a hot liquid flow, in general hot water, which crosses the capsule and, coming in contact with the preparation contained in it, it involves the formation of a hot drink which exits the machine and is supplied into a collection container.

In prior art relative to the capsules for the production of coffee and in particular for the production of coffee of the type which is usually known as "American type coffee" or filter coffee, for example the solution disclosed in the patent US2010303964A1 in the name of Keurig is known, which is relative to a capsule for the use in the production of a drink comprising a container defining an internal space that has first and second portions, the container having a surface intended to be perforated by a perforation element to allow a drink to exit the internal space, a drink preparation material structured to interact with a liquid which is introduced into the container to produce a drink, the drink preparation material being located in the first portion of the internal space, a filter connected to the container and at least partially located in the internal space, the filter being placed in such a way that the liquid interacting with the drink preparation material in the first portion of the internal space flows across the filter towards the second portion of the internal space; and a protection of the filter which is located in the internal space and structured to get in contact with a perforation element and create an obstacle to the damage of the filter when the surface of the container is perforated by the perforation element to allow the drink to exit the internal space.

Problems of the Prior Art

The machines, the capsules and the methods for the production of coffee of the prior art have various disadvantages.

First of all in the machines for the production of drinks of the prior art, when it is necessary to prepare a coffee of the type which is usually known as "American type coffee" or filter coffee it can happen that during the preparation phase of the drink the formation of coffee cream also occurs, which is highly desirable in the case of an espresso type coffee but which is instead highly undesirable in the case of an "American type coffee" or filter coffee.

As a consequence of the presence of cream a drink is obtained, in particular an "American type coffee" or filter coffee, which is not immediately utilizable for drinking and it is necessary to wait for the cream to dissolve in order to be able to serve the drink itself.

Furthermore the formation of cream can happen also due to the introduction of coffee having different characteristics into the capsule, e.g. with a more or less fine grinding degree or type of the coffee mixture, with respect to those for which the machine, the capsule or the operating method of the machine, namely the preparation method of the drink, have been designed.

The capsules for the production of an "American type coffee" or filter coffee have many problems.

For example the solution which is described in US2010303964A1 in the name of Keurig, is constructively complex because it provides a filtering element placed within a sealed casing to be necessarily perforated in order to allow the drink to exit after infusion of the water with the preparation which is contained in the capsule. In addition to the complexity of supplying a punching device in the drink preparation machine which must be able to perforate the bottom of the capsule, it must also be underlined that the use of a protection disc is needed which is free to move inside the capsule itself so that when the punching device penetrates the capsule, perforating it, it does not also cause the breakage of the filter with a consequent dump of the preparation in the drink itself and with the loss of the filtering effect. Besides this manufacturing complexity, the solution also presents a disadvantage in that the movement of the protection inside the capsule which occurs at the moment of the perforation itself by means of the punching device, also involves a change of the internal structure of the capsule and of its internal volumes ratio which, as found by the applicant of the present invention, have peculiar characteristics which are very important to avoid the occurrence of cream generation phenomena of the preparation which absolutely have to be avoided in the case of preparing an "American type coffee" or filter coffee. Moreover the movement of the protection inside the capsule also causes a movement of the filter with the consequence that the integrity of the filter is not anyway guaranteed due to the fact that even in the case of slight defects in its manufacture or in its fixing inside the capsule could cause breakings with the consequent loss of preparation material with the drink itself. Moreover the movement of the protection inside the chamber of the capsule is likely to cause an at least partial compression of the contained preparation, at least partially compromising the quality of the final drink, according to what has been found by the applicant following a careful analysis and laboratory tests.

SUMMARY OF THE INVENTION

The aim of the present invention is to supply a machine for the production of hot drinks, in particular coffee and more in particular "American type coffee" or filter coffee, which allows the preparation of an "American type coffee" or filter coffee having improved qualitative characteristics in which a more effective extraction of the substances and of the compounds, which contribute to the formation of the flavor and aroma of the supplied drink, occurs.

A further aim of the present invention is also to supply a capsule for the production of hot drinks, in particular coffee and more in particular "American type coffee" or filter coffee, which allows a more effective extraction of the substances and of the compounds which contribute to the formation of the flavor and aroma of the supplied drink.

Finally, the supply of an operating method of a machine for the production of hot drinks, in particular coffee and more in particular "American type coffee" or filter coffee, which allows the preparation of "American type coffee" or filter coffee without causing the formation of cream, falls within the aims of the present invention.

Another aim of the present invention is to manufacture a coffee machine which is efficient, functional, compact and economical.

Concept of the Invention

The aim is achieved with the characteristics of the main claim. The dependent claims represent advantageous solutions.

Advantageous Effects of the Invention

The solution according to the present invention, by means of the considerable creative contribution, the effect of which constitutes an immediate and non-negligible technical progress, presents many advantages.

In particular the capsule, the machine and the method for the production of "American type coffee" or filter coffee according to the present invention are reciprocally linked and from the reciprocal interaction of these elements, which are linked by a single inventive concept according to the present invention, the hereinafter described advantageous effects derive.

A first advantage consists in the fact that by means of the solution according to the present invention the production of a drink is obtained, in particular coffee and more in particular "American type coffee" or filter coffee in absence or with minimum production of cream, which is a particularly desirable condition in the production of "American type coffee" or filter coffee.

Furthermore, according to the solution according to the present invention, the advantage is also present to allow a more effective extraction of the substances and of the compounds that contribute to the formation of the flavor and of the aroma of the supplied drink.

BRIEF DESCRIPTION OF THE DRAWINGS

An embodiment of the invention is now described with reference to the appended drawings to be considered as a non limiting example of the present invention in which.

DETAILED DESCRIPTION OF THE INVENTION

Figure 1:
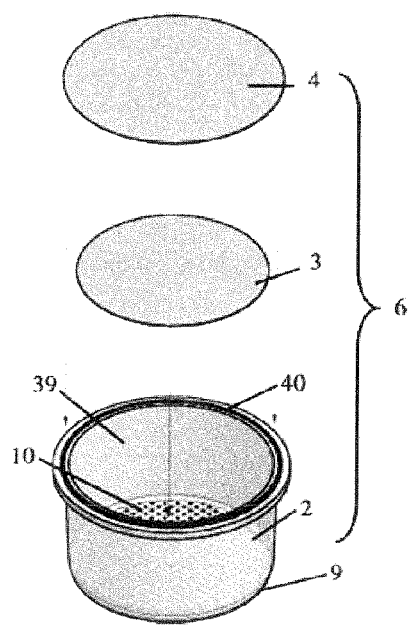
FIG. 1 represents an exploded view of the capsule made according to the present invention.
Figure 2:
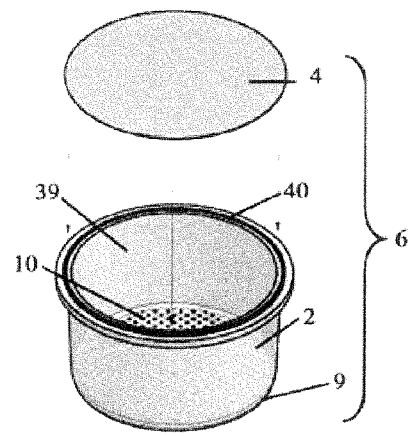
FIG. 2 represents a view of the capsule of FIG. 1 in which some of the components have been partially assembled.
Figure 4:
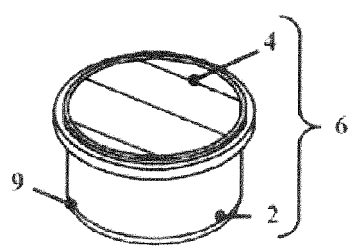
FIG. 4 represents a view of the capsule of FIG. 3 in an assembled configuration.
Figure 3:
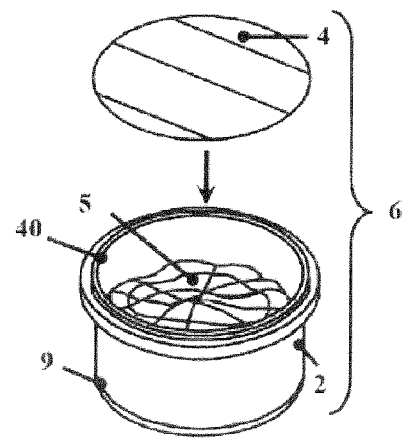
FIG. 3 represents a view of the capsule of FIG. 2 in which a drink preparation proportion has been added.
Figure 5:
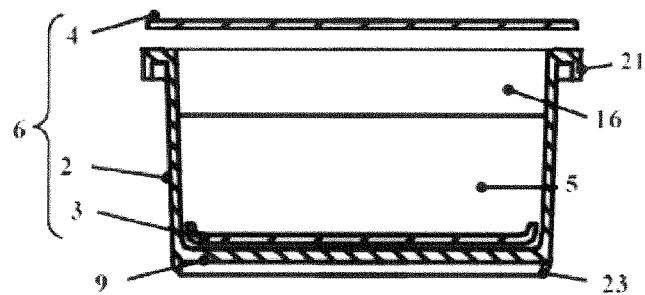
FIG. 5 represents a sectional view of the capsule of FIG. 4.
Figure 6:
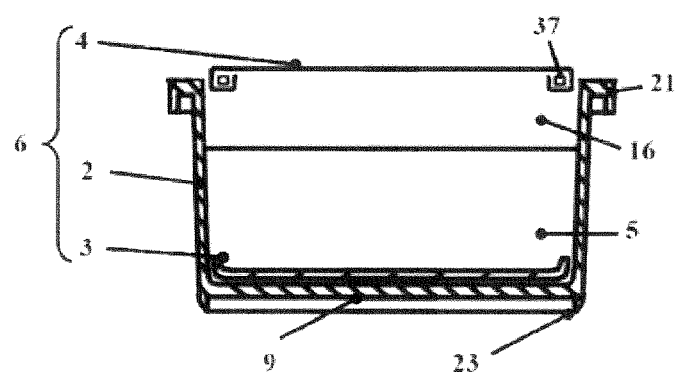
FIG. 6 represents a sectional view of a different embodiment of the capsule of FIG. 4.
Figure 7:
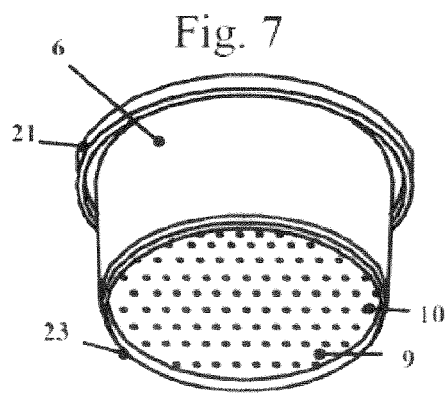
FIG. 7 represents a three-dimensional view from the bottom of the capsule of FIG. 4.
Figure 8:
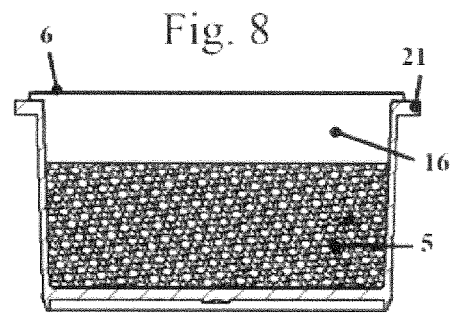
FIG. 8 represents a sectional view of a different embodiment of the capsule of FIG. 4.

Referring to the figures (FIG. 1, FIG. 2, FIG. 3, FIG. 4, FIG. 5, FIG. 6, FIG. 7, FIG. 8), the capsule (6) is shaped according to a slightly conical essentially cylindrical shape and it consists of an internally hollow casing (2) defining a housing (39) open on a side by means of an introduction mouth (40) and closed on the opposite side by means of a bottom (9). The housing (39) is able to contain a predefined preparation proportion for a drink (5), in particular ground coffee. It will be however evident that, although the capsule (1) is particularly conceived and shaped for the production of coffee, and in particular coffee of the type which is usually known as "American type coffee" or filter coffee, however it can also contain other types of preparations for drinks (5), e.g. tea, powdered milk, etc. The slightly conical shape develops starting from the introduction mouth (40) towards the bottom (9) according to one configuration in which the diameter of the mouth (40) is slightly greater than the diameter of the bottom (9). For example the diameter of the mouth (40) can be of about 50 mm and the diameter of the bottom (9) can be of about 46 mm, in general with a relation between the diameter of the bottom (9) with respect to the diameter of the mouth (40) within a range from 0.90 to 0.96, preferably with a deviation of the wall of the housing (39) with respect to the vertical direction within a range from 1 to 5 degrees. The diameter of the mouth (40) will be in the range from 30 to 60 mm, preferably in the range from 45 to 55 mm, even more preferably 50 mm. The height of the capsule will be in the range from 20 to 40 mm, preferably in the range from 25 to 35 mm, even more preferably 30 mm. Such measures are non-random measures and they themselves form part of the present invention as the applicant after repeated experiments has identified some dimensional ranges and shape relations that, in combination with further parameters, such as the filling factor of the capsule and operative pressures, are able to ensure the non-formation of cream during the distribution phase.

The bottom (9) of the capsule (6) is provided with a holed grid (10) which puts into communication the inside of the housing (39) with the outside of the capsule (6) to allow the passage of the liquid during the preparation of the drink. Preferably the diameter of the holes is within the range from 0.3 to 0.6 mm. Within the housing (39), in correspondence of the bottom (9) a first round filter (3) is inserted which preferably is welded on the bottom (9) itself. Preferably the first filter (3) is a round filter made of paper.

Within the housing (39) of the capsule (6) the preparation for drink (5), preferably ground coffee, is inserted. This preparation for drink (5) does not completely fill the internal volume of the housing (39) but it leaves an air gap (16), whose function will be explained in the following of the present description. It should be noted that if the dosage of the amount of coffee occurs by measuring the weight of the preparation for drink (5) which is introduced, then the volume of the air gap (16) can change according to the more or less fine grinding degree of the preparation for drink (5) itself.

Finally the part of the mouth (40) is closed by a second round filter (4) with a diameter which is greater than the diameter of the mouth (40).

In one embodiment (FIG. 5) the second filter (4) having a diameter greater than the diameter of the mouth (40) is installed in such a way to rest on the upper part on the perimetrical edge (21) defining the mouth (40). The fixing can occur by means of welding or heat fixing.

Figure 11:
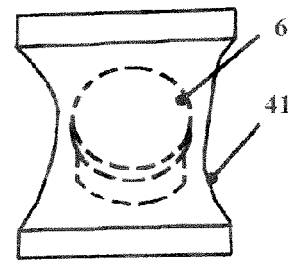
FIG. 11 schematically represents the capsule enclosed in a corresponding packaging to preserve the fragrance of the drink preparation contained in the capsule itself.

The thus obtained capsule (6) is not hermetic and advantageously it does not require to be perforated for its use as occurs in some of the capsules of the prior art, so that also the corresponding machine for the production of drinks will be simpler from this point of view, the presence of appropriate perforating means of the capsule being not required. In order to preserve the fragrance of the preparation for drink (5), the capsule (6) is finally enclosed (FIG. 11) in a preferably sealed packaging (41).

In correspondence of the mouth (40), the capsule (6) presents a first edge (21) which is conceived and shaped to allow a correct and precise insertion into a corresponding machine for the production of the drink that will be described in the following of the present description. In particular the first edge (21) is shaped in such a way to obtain the sealing in correspondence of this part of the capsule during the distribution, as it will be explained in the following of the present description.

In correspondence of the bottom (9), the capsule (6) has a second edge (23) which is conceived and shaped to obtain the sealing in correspondence of this part of the capsule during the distribution, as it will be explained in the following of the present description.

Advantageously, as it will be explained in the following of the present description the capsule (6) is shaped with thicknesses which are absolutely unusual in the field of capsules for the production of drinks, and in particular the thickness of the casing (2) is within a range from 0.8 to 1.2 mm, preferably 1 mm. This choice is not the result of a random choice but it is due to well determined needs on the basis of the experiments carried out by the applicant in order to obtain very good qualitative results in the preparation of coffee and in particular of "American type coffee" or filter coffee. The capsule is indeed structurally shaped to support pressures up to 10 bar, for the reasons which will be explained in the following of the present description.

It is necessary to specify that the first edge (21) does not necessarily have a round shape as it is represented and it could assume even quadrangular shapes.

Figure 9:
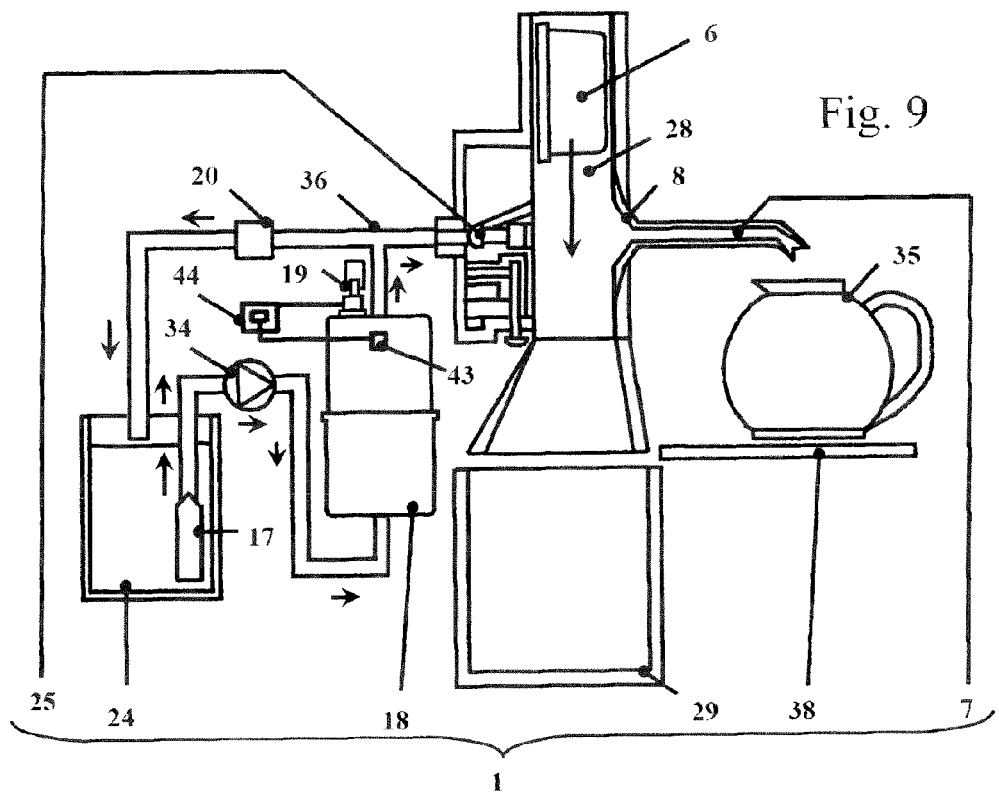
FIG. 9 represents a scheme showing the machine for the production of coffee made according to the present invention.

The machine (1) for the production of the drink according to the present invention (FIG. 9) works making hot water or anyway a hot fluid pass within a pre-manufactured capsule (6) made of a plastic material containing a predetermined quantity of preparation for a drink (5), in particular ground coffee for the production of "American type coffee" or filter coffee, this quantity being sufficient to supply a drink portion, namely "American type coffee" or filter coffee.

The machine (1) for the production of the drink includes a tank (24) containing a reserve of water which is sufficient to prepare a number of drinks depending on the overall size of the machine.

By means of pipes (36) the water of the tank (24) is taken by means of a pump (34), preferably a vibration pump, through a first softener filter (17) in order to be sent to a boiler (18) intended to contain the water with which the drink has to be prepared. Inside the boiler (18) a resistance (19) is present for heating the water contained in the boiler (18) itself. The water is restored in the boiler by means of withdrawing from the tank (24). The restoring occurs by means of the pump (34) which also has the function of putting the water in the distribution circuit under pressure, which will be described in the following of the present description.

The exit of the boiler (18) is connected to a hydraulic group (25) which will be described in the following of the present description and on the same outlet pipe (36) an electro-valve (20) or discharge electro-valve is also present, which is preferably a normally closed electro-valve which allows to discharge the pressure which is created in the boiler (18) by means of the pump (34) during the phase of hydraulic pressure and distribution as well as to allow the return of the exceeding water which is contained in the circuit towards the tank (24). The electro-valve (20) has a very important function in the machine operation will be explained in the following of the present description.

Therefore, shortly, following the distribution command, the pump (34) is started and supplies the distribution hydraulic group (25) taking water from the tank (24) through the first softener filter (17). The water passing inside the boiler (18) is heated by the electric resistance (19). Once the water flow has been generated as will be explained hereinafter, the water crosses the capsule (6) which is inserted within the duct (28) until it is placed in correspondence of the conveying bottom (8). When the water crosses the capsule (6) it extracts the substances and the compounds which contribute to the formation of the flavor and aroma of the thus produced drink. After crossing the capsule (6), the drink is collected by means of the conveying bottom (8) and it is addressed towards the distribution nozzle (7) which sends it to a collection container (35), which, for example, can be placed in correspondence of a heated or heating plate which according to known principles heats the collection container (35) in order to maintain the drink hot for a certain time during which the drink can be consumed by one or more users depending on the sizes of the collection container (35). The collection container (35) can be a cup, a jug or another type of container.

Figure 10:
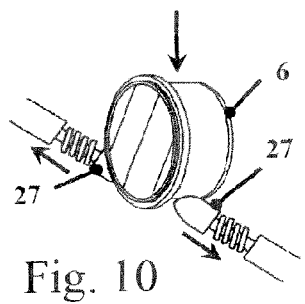
FIG. 10 schematically represents the stopping system in the position of use of the capsule within the machine for the production of coffee made according to the present invention.
Figure 13:
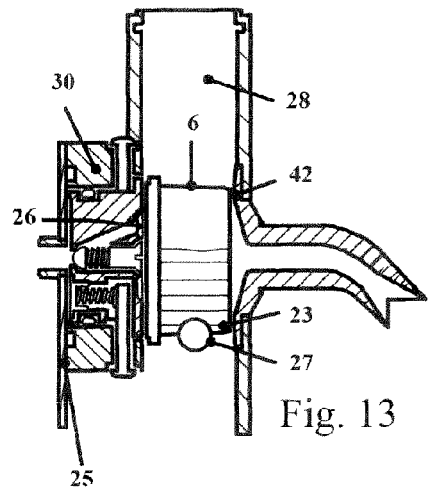
FIG. 13 schematically represents a sectional view of the hydraulic group of FIG. 12 with the capsule inserted and stopped in position by means of the stopping system in position of use of the capsule.
Figure 14:
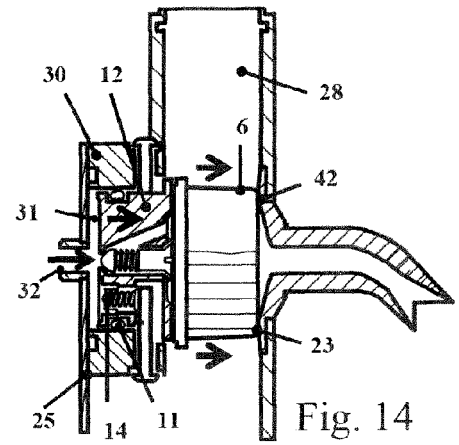
FIG. 14 schematically represents a sectional view of the hydraulic group of FIG. 13 in a first phase of the preparation cycle of the drink.
Figure 19:
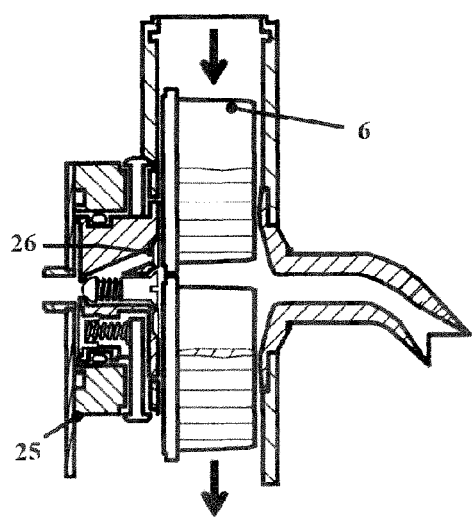
FIG. 19 schematically represents a sectional view of the hydraulic group of FIG. 18 in a fourth expelling phase of a capsule used with the introduction of a new capsule for the production of the drink.

The introduction of the capsule (6) for its use occurs through a duct (28) having a shape corresponding to that of the capsule (6) and having such dimensions as to allow the falling by gravity of the capsule (6) through it without obstacles. The position of use of the capsule (6) is preferably defined by a stopping system consisting (FIG. 10) of one or more pins (27), for example a couple of retractable pins (27) with return spring whose rest position is such that the tip of the pins is in an interference condition (FIG. 13) with the capsule which is introduced into the duct (28). In this way the capsule (6), falling by gravity within the duct (28), is stopped at the position of use which is defined by the position of these pins (27). The release of the capsule (6) after its use occurs applying a force (FIG. 10) on the capsule in the falling direction of the capsule itself, this force applied on the capsule (6) causing a retraction of the pins (27) which causes the release of the respective holding action leaving the capsule (6) free to fall down towards (FIG. 9) a collection basin (29) of the used capsules. For example (FIG. 19) the release force of the used capsule can be applied by means of the introduction of a new capsule (6) into the duct (28) for the production of a new drink. The force applied on the new capsule (6) will be transferred to the old capsule causing the retraction of the pins (27) and the release of the old capsule which can continue its path within the duct (28) to reach the collection basin (29) of the used capsules. Preferably the duct (28) is provided on the upper part with a door hinged on one side (not represented) on which there is a pushing portion that helps the pushing action which is applied on the new capsule within the duct by the user who applies a closing force of the door itself.

Relatively to the operation of the hydraulic group (25), the applicant has studied a configuration and an operating method which in combination with the previously described particular shape of the capsule (6) allow to obtain very good results in the preparation of "American type coffee" or filter coffee, with considerably better results with respect to those of the prior art both from the point of view of the extraction capability of the aromas and from the point of view of the prevention of the formation of cream, which is highly undesirable in this type of drinks.

Once the capsule (6) has reached (FIG. 13) the operating position which is defined by the previously described stopping system (27), the production cycle of the drink is activated as described hereinafter.

When the water is heated and put under pressure in the boiler (18) by means of electrical resistance (19) and the pump (34), the hydraulic group (25) prevents the water from crossing the capsule (6) by means of a water flow blocking system. Only following the reaching of a first operating threshold value, then the applied hydraulic pressure becomes enough to win the force of a first counter spring system (14) applying a contrast force opposing the exit movement of a piston (12) and the movement of the piston (12) occurs which exits the body (30) of the hydraulic group (25) towards the direction of the capsule (6) which is located within the duct (28). The capsule (6) is placed within the duct (28) in such a way that the exit direction of the piston (12) is an essentially orthogonal direction with respect to the mouth (40) of the capsule (6). The piston (12) will be shaped with a shape so as to couple with the first edge (21) of the capsule which constitutes a stopping and sealing surface. The capsule (6) therefore has a second edge (23) in correspondence of the bottom (9) and the capsule (6) has a first edge (21) in correspondence of the mouth (40), the second edge (23) and the first edge (21) forming end stop elements which are shaped in such a way to obtain a sealing condition during the distribution of the liquid for the production of the drink. The action of the piston (12) will therefore cause a movement of the capsule (6) in the exit direction of the piston (12) and a compression of the capsule (6) against a counter-piece (42) which is obtained in correspondence of the conveying bottom (8). By means of the coupling between the piston (12) and the first edge (21) of the capsule and by means of the coupling between the counter-piece (42) and the second edge (23) of the capsule, therefore a sealing environment is created in which the water flow will pass coming from the boiler and which will cross the inside of the capsule (6) to exit towards the nozzle (7). Preferably the first operating threshold value is between 2 and 4 bar. Preferably the first operating threshold value is set by a first spring system (14) applying a counter force so as to oppose the exit of the piston (12) and preferably the first spring system (14) is calibrated to allow the movement of the piston (12) when the applied hydraulic pressure reaches a first operating threshold value between 2 and 4 bar. Obviously in the preferred solution of the present invention the first spring system (14) will be placed in a symmetrical position with respect to the movement axis of the piston (12). In any case in the first spring system (14) a number of first springs will be present applying the force for the operation as just described.

Advantageously the driving action of the piston (12) is of the hydraulic type, the piston (12) exits the body (30) of the hydraulic group (25) after this hydraulic drive has been put under pressure, the hydraulic drive, preferably occurring by means of the same liquid which is used for the production of the drink, which penetrates an expanding chamber (31), and causes the piston (12) to advance following the increase in pressure.

Only following the reaching of a second operating threshold value, then the applied hydraulic pressure becomes enough to win the force of a second spring (15) and the movement of a distribution valve (13) occurs which frees a communication between the expanding chamber (31) and a feeding channel (33) which drives towards the capsule (6) the liquid which is used for the production of the drink. Preferably the second operating threshold value is between 4 and 10 bar, even more preferably 4 and 6 bar. Preferably the second operating threshold value is set by means of a second spring (15) applying a counter force so as to oppose the activation of the distribution valve (13) and preferably the second spring (15) is calibrated to allow the activation of the distribution valve (13) when the applied hydraulic pressure reaches a second operating threshold value between 4 and 10 bar, even more preferably 4 and 6 bar.

Figure 15:
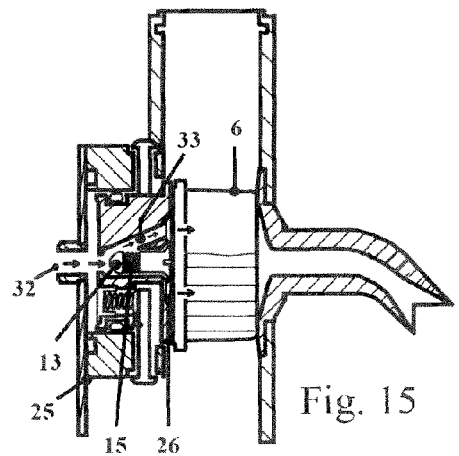
FIG. 15 schematically represents a sectional view of the hydraulic group of FIG. 14 in a second phase of the preparation cycle of the drink.
Figure 16:
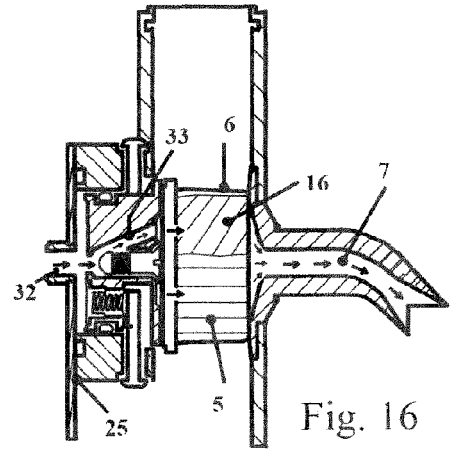
FIG. 16 schematically represents a sectional view of the hydraulic group of FIG. 15 in a third phase during the preparation of the drink.

Following the activation of the distribution valve (13), the liquid which is used for the production of the drink enters (FIG. 15) a feeding channel (33) which puts into communication the expanding chamber (31) with a diffuser (26), which is a chamber having a circular-crown shape essentially centered on the capsule (6) at the mouth (40). In this way the water penetrates (FIG. 16) the capsule (6) through this diffuser (26) having a circular-crown shape. Preferably the diffuser (26) is a chamber having a closed circular-crown shape in correspondence of the coupling surface of the capsule (6) and the flow of the liquid from the chamber towards the capsule occurs through diffusion holes which are uniformly located along this chamber having a circular-crown shape.

Figure 12:
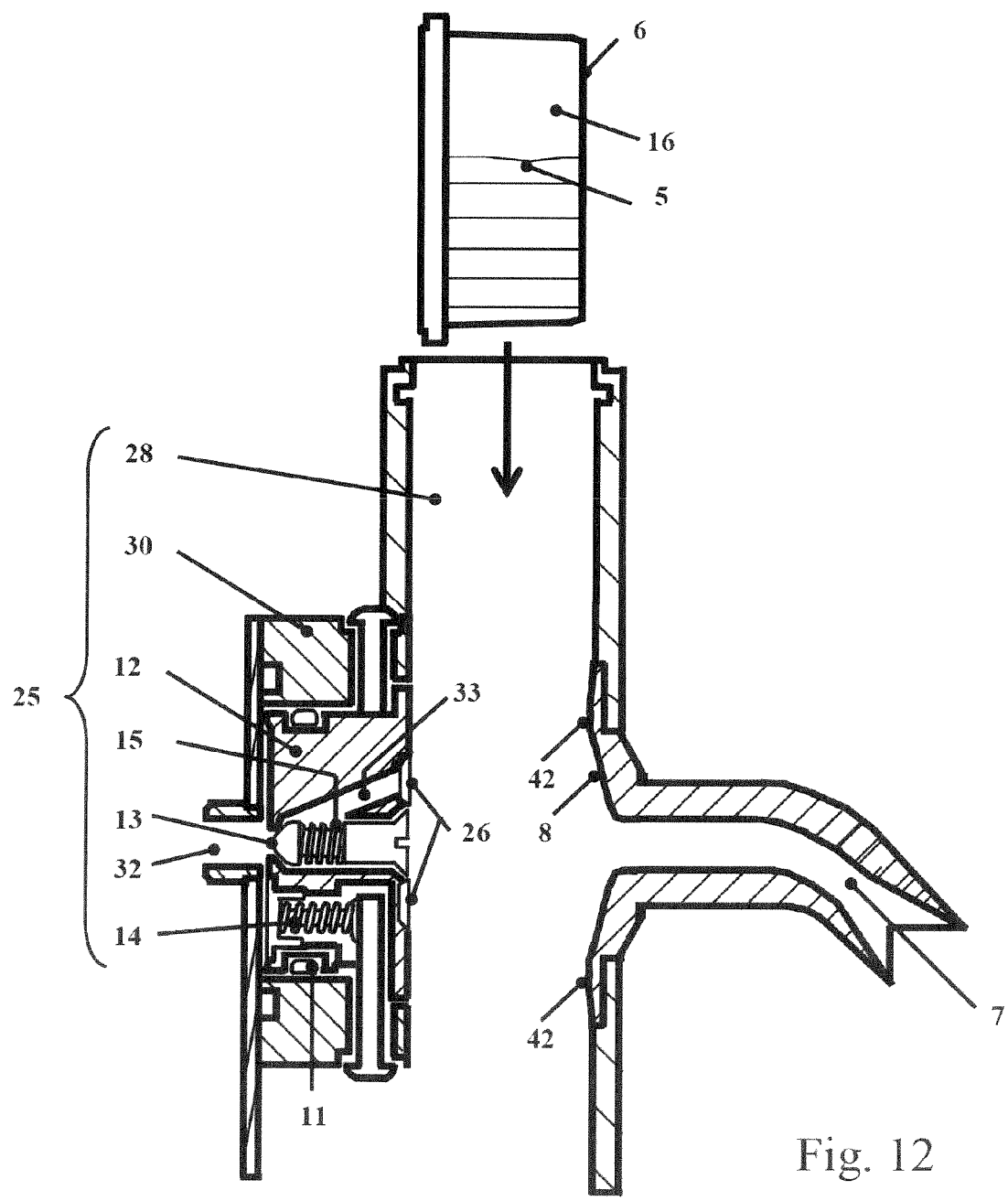
FIG. 12 schematically represents a sectional view of the hydraulic group of preparation of the drink made according to the present invention, in an insertion phase of the capsule.

By the effect of the pressure, the flow of the liquid for the preparation of the drink therefore enters (FIG. 16) the capsule (6) through the second filter (4), it at least partially fills the air gap (16) and creates an infusion with the preparation for drinks (5) with corresponding pressure drop due to the presence of the air gap and due to the withdrawing connection of the drink, in order then to exit through the first filter (3) from the bottom (9) of the capsule (6) being collected in the (FIG. 12) conveying bottom (8) to be driven across the nozzle (7) towards (FIG. 9) the container (35).

The distribution is ended when the desired quantity is reached stopping (FIG. 9) the pump (34) and opening the electro-valve (20), preferably stopping at the same time with the pump (34).

Figure 17:
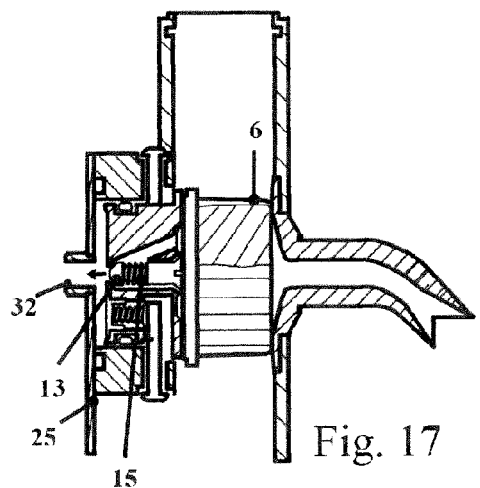
FIG. 17 schematically represents a sectional view of the hydraulic group of FIG. 16 in a fourth phase of the preparation cycle of the drink.
Figure 18:
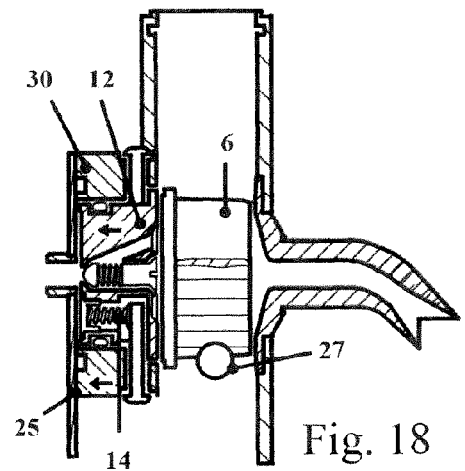
FIG. 18 schematically represents a sectional view of the hydraulic group of FIG. 17 in a fifth phase of the preparation cycle of the drink.

With the exhaustion of the hydraulic pressure caused by stopping the pump (34) and by opening the electro-valve (20), first the distribution valve (13) is closed (FIG. 17) due to the effect of the force of the second spring (15), then the force of the first spring system (14) prevails over the hydraulic force and the piston (12) is called back (FIG. 18) in the resting position, the residue pressure being eliminated discharging the exceeding water powering the electro-valve (5), the exceeding water being discharged (FIG. 9) through the electro-valve (20) towards the tank (24) in order to be able to be utilized again in a following cycle.

By opening a door (not represented) it is possible to insert (FIG. 19) another capsule (6) into the proper duct (25) of the distribution hydraulic group (25). By closing the door the stopping system (27) is activated allowing the capsule (6) to be positioned in the correct distribution position and simultaneously expelling the exhaust capsule, which goes into the collection basin (29) of the exhaust capsules.

After studies and tests, the applicant has found that in order to optimize the extraction with a greater effectiveness of the substances and of the compounds which contribute to the formation of the flavor and aroma of the supplied product without causing the formation of cream, which is particularly desirable in the preparation of "American type coffee" or filter coffee, some essential requirements must be satisfied.

First of all, unlike the prior art systems, the system of the present invention operates at high pressures, of about 4 to 10 bar, preferably 4 to 6 bar, allowing an effective extraction of the substances and compounds which contribute to the formation of the flavor and aroma of the coffee drink. Such results cannot be obtained or can be obtained only to a small degree with the prior art systems.

Indeed the prior art capsules are not suitable to operate at such pressures because they would be deformed by the applied pressure causing the machine to block. Only operating at such high pressures and with the capsules, the machine and the method according to the present invention optimal results are obtained. Therefore the capsules (6) must have the thicknesses which are indicated in the present description relatively to the description of the capsules themselves in order to resist preparation pressures that the applicant has identified as optimal to obtain the result to prepare a drink, particularly "American type coffee" or filter coffee with an excellent extraction of the aromas and in absence of the production of cream.

Furthermore in order to obtain a drink in absence of production of cream it is essential that in the capsule (6) the preparation for drinks (5), preferably ground coffee, is inserted in such a way not to completely fill the internal volume of the housing (39) but leaving out an air gap (16). In this way when the liquid for the production of the drink penetrates, the capsule a real infusion is obtained with a mixing action of the infusion itself within the capsule together with the preparation for drinks (5) which, also due to the high pressure applied, allows to effectively extract the aromas without causing the production of cream. Preferably the filling factor of the housing (39) within the capsule (6) with the preparation for drinks (5) is in the range from 35 to 90%, preferably in the range from 40 to 85%, even more preferably in the range from 45 to 75%. Preferably the proportion of the preparation for drinks (5) is carried out in weight, for example inserting a quantity from 8 to 12 grams of preparation for drinks (5). Even introducing equal weight, it is however possible to obtain different filling factors due to the different grinding degree of the preparation and depending on the type of preparation itself. Following numerous tests, moreover, the applicant has found that to avoid the formation of cream, the indicated pressure values must be further associated to a precise range of temperatures of the liquid for the production of the drink. Greater temperatures, indeed, would give place to the production of cream. For this purpose, therefore, the applicant has also studied a control system of the temperature of the water or liquid for the preparation of the drink in order to ensure that at the moment of the distribution the temperature of the water is maintained at a temperature lower than 90 degrees centigrade, preferably within a range from 84 to 89 degrees centigrade, even more preferably within a range from 85 to 86 degrees centigrade. In order to perform such a particularly precise control of temperature, unlike the prior art systems the applicant has introduced a control of temperature which does not occur by a thermostat anymore, for example of the bimetallic core type, but by means of (FIG. 9) a temperature probe (43) which transmits the information to a corresponding control system (44) which acts on the resistance (19).

The temperature control of the water of the boiler (18) occurs using the measuring data coming from the temperature probe (43) which is dipped in the boiler (18) itself. The control algorithm is based on the calculation of a control value named "p" on the basis of the measured value (measured temperature of the boiler by means of the temperature probe) and on the basis of the boiler setting programmed value (preset value), from which then the management of the power supplied to the resistance (19) present in the boiler (18) follows according to a use percentage which goes from a condition in which the resistance (19) is completely off during the whole cycle of use until a condition in which the resistance (19) is completely on during the whole cycle of use, going through intermediate conditions of use in which the resistance (19) is on for period percentages of 25%, 50% and 75%.

The control value p is calculated in the following way in the case in which a distribution condition (FIG. 20) of the drink is present, wherein the measured temperature is the temperature of the boiler which is measured by the temperature probe and the preset value is the objective temperature value at which the liquid of the boiler must be maintained:

if (measured temperature Tm)<=(preset value Vi−1° C.) then p=4 and resistance on with operating cycle at 100% if (measured temperature Tm)=(preset value Vi) then p=3 and resistance on with operating cycle at 75% if (measured temperature Tm)=(preset value Vi+1° C.) then p=2 and resistance on with operating cycle at 50% if (measured temperature Tm)=(preset value Vi+2° C.) then p=1 and resistance on with operating cycle at 25% if (measured temperature Tm)>=(preset value Vi+3° C.) then p=0 and resistance on with operating cycle at 0%

Figure 21:
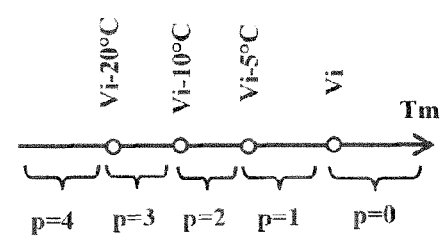
FIG. 21 represents the setting of the value control of the controller of the temperature of the liquid of preparation of the drink in the case in which a condition of not distribution of the drink is present.

The control value p is calculated in the following way in the case in which a non-distribution condition (FIG. 21) of the drink is present, wherein the measured temperature is the temperature of the boiler which is measured by the temperature probe and the preset value is the objective temperature value at which the liquid of the boiler must be maintained:

if (measured temperature Tm)<(preset value Vi−20° C.) then p=4 and resistance on with operating cycle at 100% if (measured temperature Tm)>=(preset value Vi−20° C.) and (measured temperature Tm)<(preset value Vi−10° C.) then p=3 and resistance on with operating cycle at 75% if (measured temperature Tm)>=(preset value Vi−10° C.) and (measured temperature Tm)<(preset value Vi−5° C.) then p=2 and resistance on with operating cycle at 50% if (measured temperature Tm)>=(preset value Vi−5° C.) and (measured temperature Tm)<(preset value Vi) then p=1 and resistance on with operating cycle at 25% if (measured temperature Tm)>=(preset value Vi) then p=0 and resistance on with operating cycle at 0%

The time base for the activation of the resistance (19) is of 2 seconds with a step of 0.5 seconds. According to the calculated value of p the time of activation of the resistance (19) changes:

p=0: resistance always off p=1: resistance on for 0.5 seconds, off for 1.5 seconds with cycle duration of 25%, even more preferably adjustable between 10% and 35% p=2: resistance on for 1 second, off for 1 second with cycle duration of 50%, even more preferably adjustable between 40% and 60% p=3: resistance on for 1.5 seconds, off for 0.5 seconds with cycle duration of 75%, even more preferably adjustable between 65% and 85% p>=4: resistance always on.

Furthermore the fact of working at high pressures also allows to obtain further benefits because one can obtain a proper flow through the capsule and the filters without needing to open holes of the capsule itself, eliminating the corresponding components and preventing the exhaust capsule from being subject to losses of the preparation for drink after its use.

Figure 22:
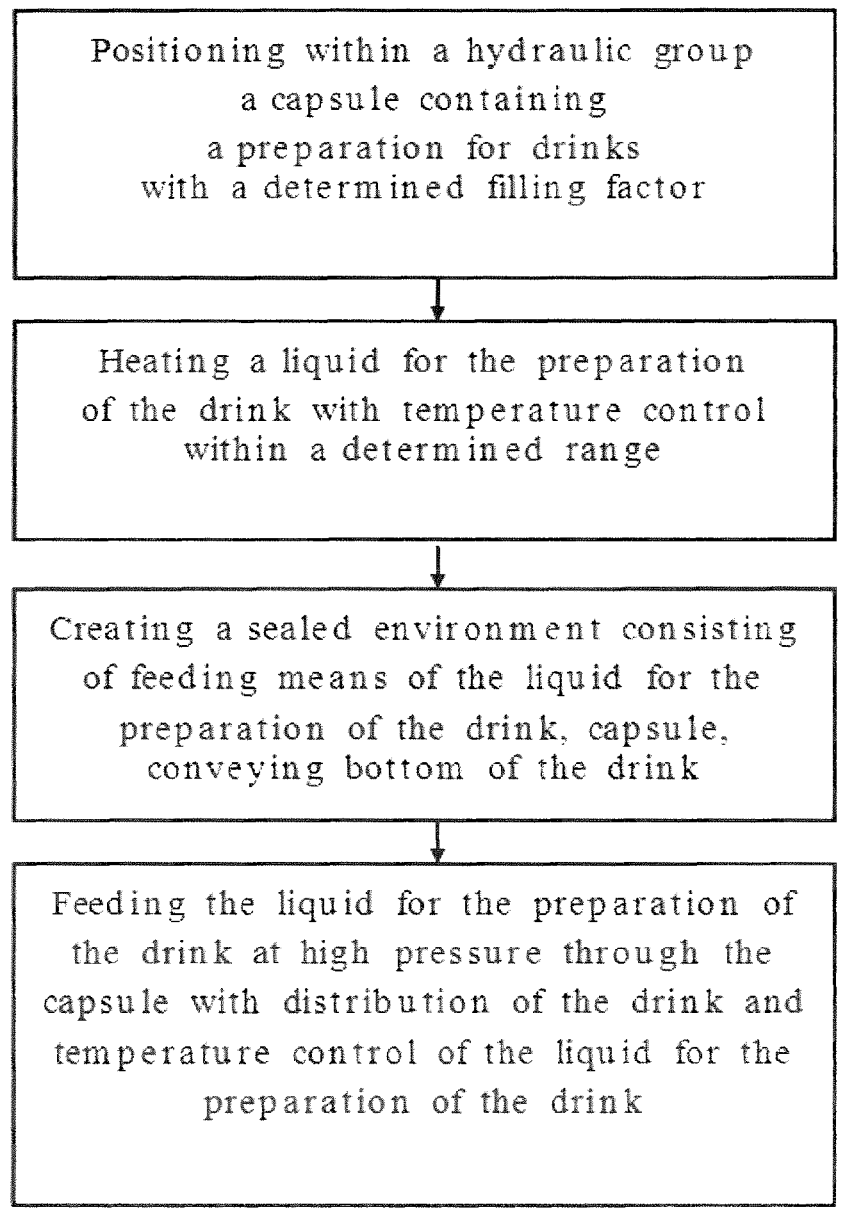
FIG. 22 represents a block diagram schematically showing the preparation method of the "American type coffee" or filter coffee according to the present invention.

The preparation method of the drink according to the present invention, therefore, includes (FIG. 22) the steps of:

positioning within a hydraulic group (25) a capsule (6) containing a preparation for drinks (5) with a determined filling factor, preferably the filling factor of the housing (39) within the capsule (6) with the preparation for drinks (5) being in the range from 35 to 90%, preferably in the range from 40 to 85%, even more preferably in the range from 45 to 75%;

heating a liquid for the preparation of the drink with temperature control within a determined range according to a temperature control mode in the case of absence of distribution of the drink;

creating a sealed environment consisting of feeding means (26) of the liquid for the preparation of the drink towards the capsule (6), capsule (6), conveying bottom (8) of the drink;

feeding the liquid for the preparation of the drink at high pressure through the capsule with distribution of the drink and temperature control of the liquid for the preparation of the drink according to a temperature control mode in the case of the presence of distribution of the drink, the pressure of this liquid for the preparation of the drink being preferably between 4 and 10 bar, even more preferably between 4 and 6 bar.

Figure 20:
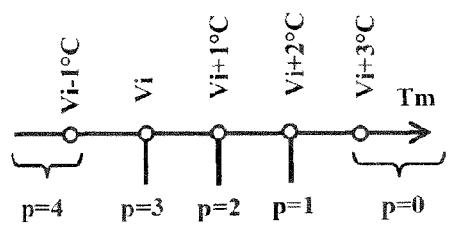
FIG. 20 represents the setting of the control value of the controller of the temperature of the liquid of preparation of the drink in the case in which a distribution condition of the drink is present.

In the method according to the present invention the temperature control according to the temperature control mode in the case of absence of distribution of the drink occurs according to what has been explained referring to FIG. 20. In the method according to the present invention the temperature control according to the temperature control mode in the case of presence of distribution of the drink occurs according to what has been explained referring to FIG. 21.

In general the present invention relates to a capsule (6) for the preparation of drinks, particularly coffee, even more particularly "American type coffee" or filter coffee or filtered coffee in which the capsule (6) has an essentially cylindrical shape with a mouth (40), this capsule (6) containing a predefined proportion of preparation for drink (5) according to a filling factor in the range from 35 to 90%, preferably in the range from 40 to 85%, even more preferably in the range from 45 to 75%.

In general, therefore, the present invention relates to a method for the production of drinks, particularly coffee, even more particularly "American type coffee" or filter coffee or filtered coffee by means of a machine (1) for the preparation of drinks and capsules (6) containing a proportion of preparation for drink (5), in which the method includes the phases of heating a liquid for the preparation of drinks, putting under pressure the liquid for the preparation of drinks within a boiler, feeding the liquid for the preparation of drinks to the capsule (6) with crossing of the capsule (6), taking the liquid after this phase of crossing of the capsule (6) and in which this method includes an infusion and remixing phase of the liquid for the preparation of drinks with the preparation for drink (5) within the capsule (6), this infusion and remixing phase occurring within a housing (39) partially filled up with the preparation for drink (5) according to a filling factor in the range from 35 to 90%, preferably in the range from 40 to 85%, even more preferably in the range from 45 to 75%. Differently and advantageously with respect to the prior art systems, with the system according to the present invention a real infusion and remixing phase is obtained due both to the fact that a filling factor is provided leaving an air gap within the capsule, and due to the high pressures which are used, which combined with the very precise temperature control allows to obtain filter coffee without production of cream.

In general, therefore, the present invention relates to a machine (1) for the preparation of drinks in capsules (6), including a boiler (18) with a resistance (19) intended to heat a liquid for the preparation of drinks, a pump (34) intended to put under pressure the liquid for the preparation of the drinks, a hydraulic group (25) intended to feed the liquid from the boiler (18) through the capsule (6), conveying means (8) of the drink to a collection container (35) in which the hydraulic group (25) includes a distribution valve (13) blocking the distribution of the liquid for the preparation of drinks until a second operating threshold value is exceeded by the hydraulic pressure applied, this second operating threshold value being between 4 and 10 bar, even more preferably 4 and 6 bar.

Furthermore the method according to the present invention provides that the heating cycle which was described referring to the distribution phase can be modified for example according to the quantity of preparation for drink contained in the capsule, the heating cycle described referring to the distribution phase providing that after a determined fraction of the distribution period E, the control value p is set to the maximum value 4 after a certain time period S, at the most until the end of the distribution period E. By way of example only the distribution period E of the drink can last from E=20 seconds to E=70 seconds according to the liquid flow which is set and according to the drink quantity to be withdrawn. During this distribution period E, for example p can be calculated as previously indicated for at least an initial period S, while for the remaining time E−S, p is set to the maximum value 4. Obviously one can also provide that after the period S in which p is set to the maximum value 4, an additional residual end period is present in which p is again calculated as previously explained with reference to the distribution cycle. In practice, therefore, in the method for the production of drinks, particularly coffee, even more particularly filter coffee, it occurs that during the phase in which the distribution of the drink is present, the distribution time E is subdivided at least into a first time fraction and a second time fraction lasting E−S, in the first time fraction S of distribution the control value p being calculated on the basis of the measured boiler temperature and in the second time fraction E−S the control value p being set to the maximum value 4. Preferably this time E−S of activation of the resistance in a condition in which it is always on is set depending on the supplied drink quantity, which can be a parameter which is personalized for the user and according to the type of pump (34) which is used and selectable in such a way to let the machine know this setting. Therefore the lasting E−S of said second time fraction is calculated according to the supplied drink quantity.

The description of this invention has been made with reference to the enclosed figures showing a preferred embodiment of the invention itself, but it is evident that many alterations, modifications and variations will be immediately apparent to those skilled in the art in light of the foregoing description. Thus, it should be understood that the invention is not limited by the foregoing description, but embraces all such alterations, modifications and variations in accordance with the spirit and scope of the appended claims.

What is claimed is:

1. A method for the preparation of drinks, by means of a machine for the preparation of drinks and capsules containing a proportion of preparation for drink, comprising the phases of:
    heating a liquid for the preparation of drinks;
    putting under pressure said liquid within a boiler;
    coupling a hydraulic activation piston exiting from a body of a hydraulic group and placed within a capsule insertion duct, the exit direction of said piston essentially orthogonal with respect to a mouth and feeding the liquid in said capsule, said piston coupling with an edge of said capsule, the exit of said piston causing a compression and retaining said capsule against a counter-piece in correspondence with a conveying bottom of said duct;
    feeding said liquid to said capsule for crossing said liquid through said capsule;
    taking said liquid after said phase of feeding and crossing through said capsule;
    wherein said feeding phase includes an extraction and mixing phase of said liquid with said proportion of preparation for drink within said capsule;
    said extraction and mixing phase occurring within a housing partially filled up with said proportion of preparation for drink according to a filling factor in the range from 35 to 90%.

2. The method for the preparation of drinks according to claim 1 wherein said feeding phase is a high pressure feeding phase with a distribution of the drink and a temperature control of the preparation of the drink according to a temperature control mode, the pressure of the preparation of the drink is between 4 and 10 bar.

3. The method for the preparation of drinks according to claim 2 wherein said temperature control occurs by means of a calculation of a control value "p" on the basis of a temperature measured by a temperature probe in a boiler heated by means of a resistance, a management of a distribution of a power supplied to said resistance present in said boiler occurring according to a percentage of use which goes from a condition in which said resistance is completely off during the whole use cycle to a condition in which said resistance is completely on during the whole use cycle, passing through intermediate conditions of use in which said resistance is on according to percentages of 25%, 50% and 75%.

4. The method for the preparation of drinks according to claim 3 wherein when the drink is not distributed said control value p is calculated on the basis of the temperature of the boiler measured according to the following measured temperature ranges, where the measured temperature is the temperature of the boiler measured by said temperature probe and the preset value is the target temperature value at which the liquid of said boiler has to be maintained:
    if (measured temperature Tm)<(preset value Vi−20° C.) then p=4 and resistance on with operating cycle at 100%
    if (measured temperature Tm)>=(preset value Vi−20° C.) and (measured temperature Tm)<(preset value Vi−10° C.) then p=3 and resistance on with operating cycle at 75%
    if (measured temperature Tm)>=(preset value Vi−10° C.) and (measured temperature Tm)<(preset value Vi−5° C.) then p=2 and resistance on with operating cycle at 50%
    if (measured temperature Tm)>=(preset value Vi−5° C.) and (measured temperature Tm)<(preset value Vi) then p=1 and resistance on with operating cycle at 25%
    if (measured temperature Tm)>=(preset value Vi) then p=0 and resistance on with operating cycle at 0%.

5. The method for the preparation of drinks according to claim 3 wherein when the distribution of the drink occurs said control value p is calculated on the basis of the temperature of the boiler measured according to the following measured temperature ranges, where the measured temperature is the temperature of the boiler measured by said temperature probe and the preset value is the target temperature value at which the liquid of said boiler has to be maintained:
    if (measured temperature Tm)<=(preset value Vi−1° C.) then p=4 and resistance on with operating cycle at 100%
    if (measured temperature Tm)=(preset value Vi) then p=3 and resistance on with operating cycle at 75%
    if (measured temperature Tm)=(preset value Vi+1° C.) then p=2 and resistance on with operating cycle at 50%
    if (measured temperature Tm)=(preset value Vi+2° C.) then p=1 and resistance on with operating cycle at 25%
    if (measured temperature Tm)>=(preset value Vi+3° C.) then p=0 and resistance on with operating cycle at 0%.

6. The method for the preparation of drinks according to claim 5 wherein when the distribution of the drink occurs the distribution time E is subdivided at least into a first time fraction S and a second time fraction of duration E−S, in said first time fraction S of distribution said control value p being calculated on the basis of the measured temperature of the boiler and in said second time fraction E−S said control value p being set to the maximum value 4.

7. The method for the preparation of drinks according to claim 6 wherein the duration E−S of said second time fraction is calculated according to the quantity of drink supplied or the distribution time.

8. The method for the preparation of drinks according to claim 1 wherein the filling factor is in the range from 40 to 85%.

9. The method for the preparation of drinks according to claim 8 wherein the filling factor is in the range from 45 to 75%.

10. The method for the preparation of drinks according to claim 2 wherein said high pressure is between 4 and 6 bar.

11. The method of claim 1 wherein the liquid is fed through a hydraulic group of the machine, the hydraulic group including a distribution valve blocking the distribution of said liquid from said boiler to said capsule until a second operating threshold value is exceeded by the hydraulic pressure applied by said liquid, said second operating threshold value between 4 and 10 bar.

12. The method of claim 11 wherein said second operating threshold value is at least 4 and less than 5 bar.

13. A method for the preparation of drinks comprising the steps of:
providing a capsule having a proportion for preparation of a drink;
heating a liquid;
pressurizing said liquid within a boiler;
coupling said capsule to a hydraulic activation piston exiting from a body of a hydraulic group and placed within a capsule insertion duct, said piston coupling with an edge of said capsule, the exit of said piston causing a compression and retaining said capsule against a counter-piece in correspondence with a conveying bottom of said duct;
feeding said liquid to said capsule when the pressure of said liquid is at least 4 and less than 5 bar;
mixing said liquid with the proportion for preparation of a drink;
dispensing said liquid through a filter contained within said capsule wherein said mixing phase occurs within a housing partially filled up with said preparation for drink according to a filling factor in the range from 35 to 90%.

14. The method of claim 13 wherein said capsule has a height in the range of 17-20 mm, a diameter in the range of 47 to 58 mm and a wall thickness in the range of 0.8 to 1.2 mm.

15. The method of claim 13 wherein the filling factor is in the range of 60 to 85%.

16. The method of claim 13 wherein the filling factor is 70%.

17. The method of claim 13 wherein the ratio of height to diameter of the capsule is in the range of 1:2.76 to 1:3.41.

18. The method of claim 13 wherein the ratio of thickness to diameter of the capsule is in the range of 1:72.5 to 1:39.1667, and the ratio of thickness to height is in the range of 1:25 to 1:14.166.

* * * * *